United States Patent [19]

Ebihara et al.

[11] Patent Number: 5,231,512
[45] Date of Patent: Jul. 27, 1993

[54] EDITING APPARATUS EMPLOYING SERIAL TO PARALLEL CONVERTERS AND PARALLEL TO SERIAL CONVERTERS TO ACHIEVE A DIMENSIONAL REDUCTION OF THE APPARATUS

[75] Inventors: Norio Ebihara; Satoru Kusaka; Tsutomu Takamori; Tetsuro Kato, all of Kanagawa; Masakatsu Kaburagi, Tokyo; Kiyoshi Inoue, Kanagawa, all of Japan

[73] Assignee: Sony Corporation, Tokyo, Japan

[21] Appl. No.: 673,681

[22] Filed: Mar. 22, 1991

[30] Foreign Application Priority Data

Mar. 26, 1990 [JP] Japan ............................. 2-78265

[51] Int. Cl.[5] ............................................. H04N 5/76
[52] U.S. Cl. ................................... 358/335; 358/181; 360/14.1
[58] Field of Search ............... 358/335, 310, 311, 181, 358/22, 183; 360/14.1, 14.2, 14.3, 32, 13

[56] References Cited

U.S. PATENT DOCUMENTS

| | | | |
|---|---|---|---|
| 4,528,600 | 7/1985 | Ishiguro et al. | 360/14.1 |
| 4,532,502 | 7/1985 | Menezes et al. | 360/14.1 |
| 4,945,425 | 7/1991 | Hahn | 358/311 |
| 5,036,395 | 7/1991 | Reimers | 358/181 |
| 5,051,845 | 9/1991 | Gardner et al. | 360/14.1 |

FOREIGN PATENT DOCUMENTS

0039152A1 11/1981 European Pat. Off. .

OTHER PUBLICATIONS

SMPTE Journal, vol. 94, No. 8, Aug. 1985, US, pp. 810-813; B. Rayner: "High-Level Switcher Interface Improves Editing Techniques".
Society of Motion Picture and Television Engineers, 4:2:2 Digital Video, Background and Implementation, Feb. 1985, New York, USA, pp. 83-89; D. Nasse et al.: "An Experimental All-Digital Television Center".

Primary Examiner—Tommy Chin
Assistant Examiner—Thai Tran
Attorney, Agent, or Firm—Philip M. Shaw, Jr.

[57] ABSTRACT

An editing apparatus for editing digital video signals employs a number of video recording and/or reproduction devices, a signal processing mechanism, and a switching mechanism, wherein the number of transfer lines and the area occupied by the associated connectors is decreased by converting parallel signals into serial format.

7 Claims, 3 Drawing Sheets

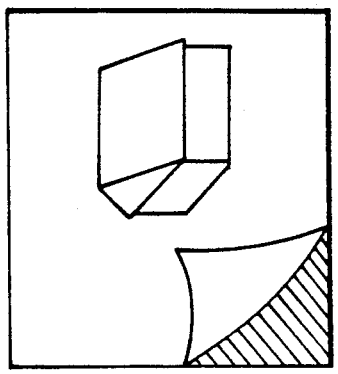
FIG. 3
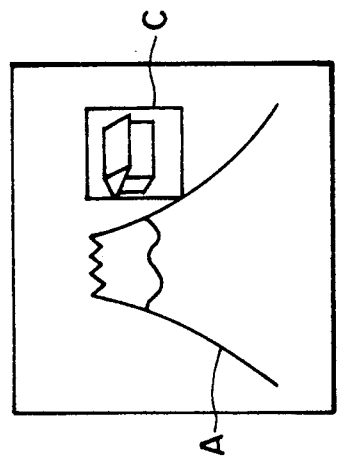
FIG. 4
FIG. 5
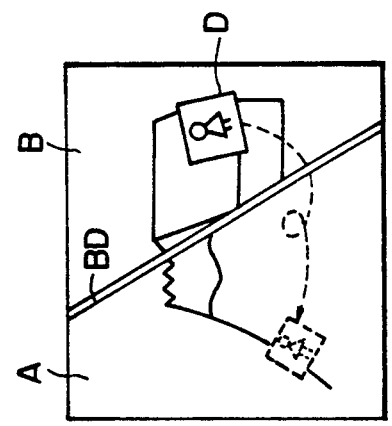
FIG. 7
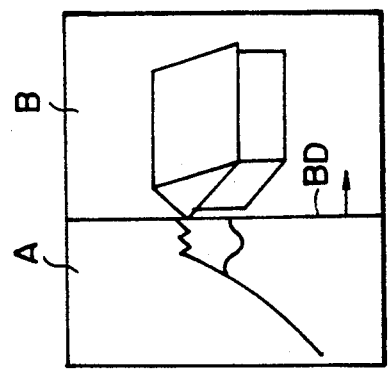
FIG. 6

EDITING APPARATUS EMPLOYING SERIAL TO PARALLEL CONVERTERS AND PARALLEL TO SERIAL CONVERTERS TO ACHIEVE A DIMENSIONAL REDUCTION OF THE APPARATUS

BACKGROUND OF THE INVENTION

1. Field of the Invention

The present invention relates to an apparatus for editing video signals and, more particularly, to an editing apparatus having a plurality of digital video appliances.

2. Description of the Prior Art

In the conventional video signal editing apparatus, there is known a prior example disclosed in U.S. Pat. No. 4,528,600. And there are also known those capable of processing video signals converted into a digital form (hereinafter referred to as digital video signals).

In such editing apparatus, video appliances (hereinafter referred to as digital video appliances) such as video tape recorders (hereinafter referred to as digital video tape recorders) capable of recording and reproducing digital video signals, a switcher and a special effect device are connected to one another by means of 25-pin connectors, and digital video signals are transferred among the appliances via such connectors.

In the conventional digital video appliances where digital video signals are transferred via such 25-pin connectors, the areas occupied by the connectors are wide to consequently raise a problem that the digital video appliances are rendered dimensionally large.

Particularly in the switcher which transfers input and output digital video signals from and to the individual digital video appliances, a multiplicity of connectors need to be employed to eventually cause a dimensional increase of the switcher.

OBJECTS AND SUMMARY OF THE INVENTION

It is a primary object of the present invention to provide an editing apparatus wherein the number of transfer lines can be decreased and the area occupied by each of connectors for such transfer lines is diminished to consequently achieve a dimensional reduction of the apparatus as a whole.

And another object of the present invention resides in providing an editing apparatus wherein a plurality of digital video appliances can be easily controlled with simplified operations.

For the purpose of achieving the primary object mentioned, the present invention has improvements in an editing apparatus having playback means for reproducing video signals from recording media and a recording means for recording the reproduced video signals on a recording medium. The editing apparatus of the invention further comprises a signal processing means for adding special effect to the input video signal and outputting the processed signal; a switcher having a plurality of input terminals and a plurality of output terminals, and delivering the input video signal selectively to a desired output terminal; a first parallel-to-serial converting means for executing parallel-to-serial conversion of the digital video signal obtained from the playback means and supplying the converted signal to the first input terminal of the switcher; a first serial-to-parallel converting means for executing serial-to-parallel conversion of the digital video signal obtained from the first output terminal of the switcher and supplying the converted signal to the signal processing means; a second parallel-to-serial converting means for executing parallel-to-serial conversion of the digital video signal obtained from the signal processing means and supplying the converted signal to the second input terminal of the switcher; and a second serial-to-parallel converting means for executing serial-to-parallel conversion of the digital video signal obtained from the second output terminal of the switcher and supplying the converted signal to the recording means.

For the purpose of achieving another object mentioned, the present invention has improvements in an editing apparatus having playback means for reproducing video signals from recording media and a recording means for recording the reproduced video signals on a recording medium. The editing apparatus of the invention further comprises a signal processing means for adding special effect to the input video signal and outputting the processed signal; a switcher having a plurality of input terminals and a plurality of output terminals, and delivering the input video signal selectively to a desired output terminal; a first parallel-to-serial converting means for converting parallel-to-serial conversion of the digital video signal obtained from the playback means and supplying the converted signal to the first input terminal of the switcher; a first serial-to-parallel converting means for executing serial-to-parallel conversion of the digital video signal obtained from the first output terminal of the switcher and supplying the converted signal to the signal processing means; a second parallel-to-serial converting means for executing parallel-to-serial conversion of the digital video signal obtained from the signal processing means and supplying the converted signal to the second input terminal of the switcher; a second serial-to-parallel converting means for executing serial-to-parallel conversion of the digital video signal obtained from the second output terminal of the switcher and supplying the converted signal to the recording means; and a control means for controlling the playback means, the recording means, the signal processing means and the switcher in accordance with the editing data.

The above and other features and advantages of the present invention will become apparent from the following description which will be given with reference to the illustrative accompanying drawings.

BRIEF DESCRIPTION OF THE DRAWINGS

FIGS. 3 through 7 are schematic diagrams illustrating the operation of the editing apparatus shown in FIG. 1.

DESCRIPTION OF THE PREFERRED EMBODIMENTS

Hereinafter an exemplary embodiment of the present invention will be described with reference to the accompanying drawings.

Figure 1:
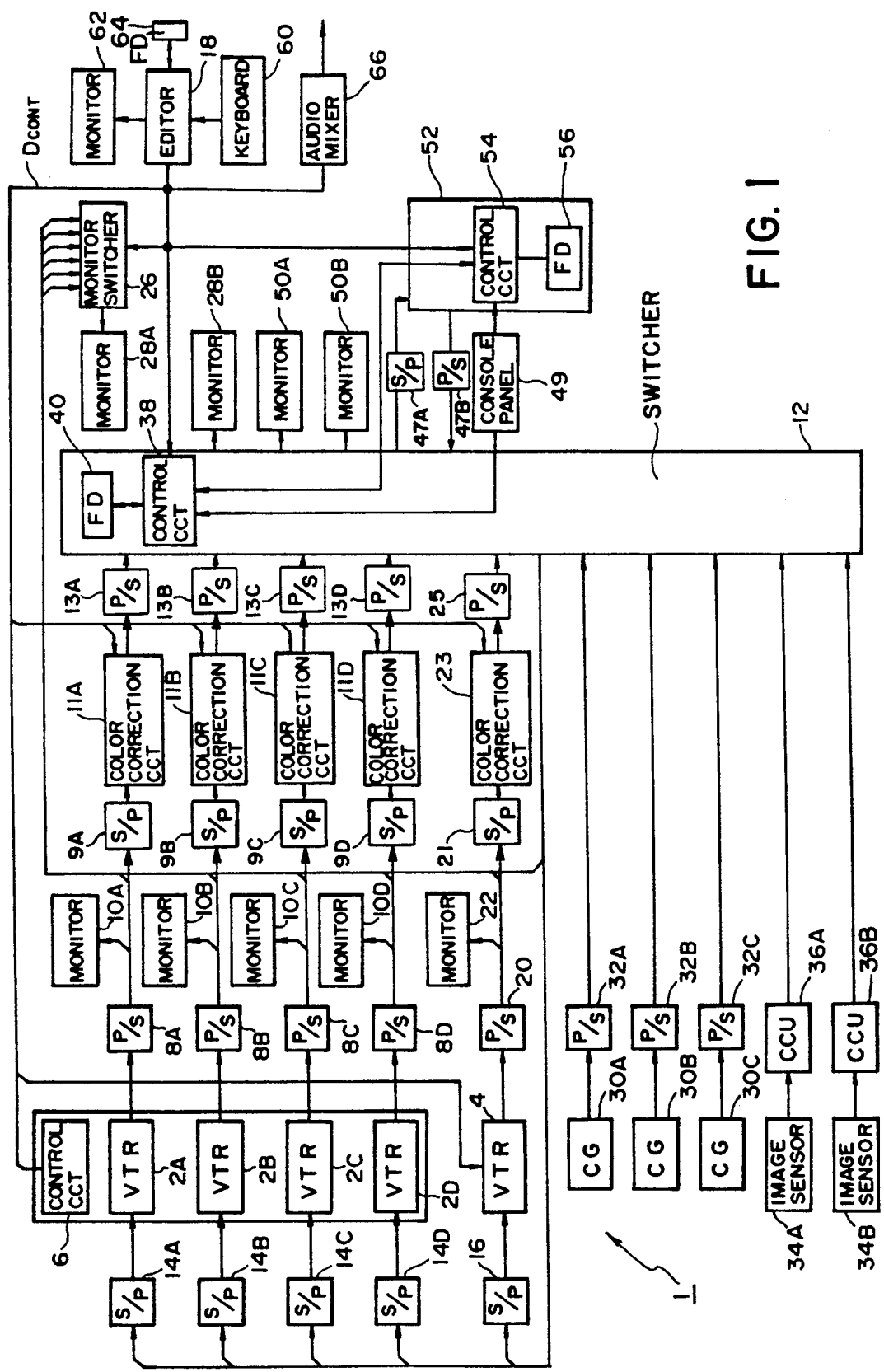
FIG. 1 is a block diagram of an exemplary editing apparatus embodying the present invention.

FIG. 1 shows the entire constitution of an editing apparatus 1, wherein desired cuts are played back by digital video tape recorders (VTRs) 2A–2D and then are recorded by a digital video tape recorder 4.

The digital video tape recorders 2A-2D are installed in a vertical arrangement, and the operations thereof are switched in accordance with control data outputted from a control circuit 6.

More specifically, the digital video tape recorders 2A-2D are disposed in combination with a shelf assembly (not shown) where a plurality of tape cassettes are arrayed. When control data $D_{CONT}$ is inputted to the control circuit 6, a tape cassette carrier (not shown) disposed between the digital video tape recorders 2A-2D and the shelf assembly is driven for carrying a desired tape cassette from the shelf assembly and loading the same in one of the digital video tape recorders 2A-2D, or ejecting a designated tape cassette from one of the digital video tape recorders 2A-2D and returning the same to a predetermined position in the shelf assembly.

Therefore, in the editing apparatus 1, a desired tape cassette can be played back by a desired one of the digital video tape recorders 2A-2D merely by outputting required control data $D_{CONT}$ from an editor to the control circuit 6. And edited video signals can be recorded by selectively switching any of the digital video tape recorders 2A-2D to a recording mode in compliance with each requirement.

Thus, desired tape cassettes can be automatically edited by sequentially outputting the control data $D_{CONT}$ from the editor 18 in conformity with an editing procedure.

Further the digital video tape recorders 2A-2D serially transfer the reproduced digital video signals via parallel-to-serial converters 8A-8D to monitor devices 10A-10D and color correction circuits 11A-11D.

The color correction circuits 11A-11D receive the serially transferred digital video signals via serial-to-parallel converters 9A-9D incorporated therein and convert the hues of the digital video signals in accordance with the control data $D_{CONT}$ outputted from the editor 18. After such correction, the digital video signals are supplied to a switcher 12 via parallel-to-serial converters 13A-13D.

Similarly to the above, the digital video tape recorders 2A-2D receive the output digital video signals of the switcher 12 via serial-to-parallel converters 14A-14D respectively, whereby the digital video signals are serially transferred between the switcher 12 and the digital video tape recorders 2A-2D.

Due to such serial transfer of digital video signals, it becomes possible to achieve long-distance transfer of the signals through a single cable and, if necessary, a booster may be provided in the transfer path to realize signal transfer in a long distance exceeding 300 meters.

Consequently, in the digital video tape recorders 2A-2D and the switcher 12, the area occupied by the connectors can be decreased as compared with the known value in the prior art to thereby attain a corresponding dimensional reduction.

In addition to the capability of such long-distance transfer of digital video signals, it is possible to play back any desired tape cassette merely by transmitting control data $D_{CONT}$ to the control circuit 6, so that the positions of installation of the digital video tape recorders 2A-2D are freely settable with regard to the switcher 12, hence enhancing the operational facility of the editing apparatus 1.

Furthermore, since digital video signals can be transferred through a single cable, the work of laying required cables between the switcher 12 and the digital video tape recorders 2A-2D is simplified to consequently enhance the operational facility of the editing apparatus 1.

Besides the above, in the color correction circuits 11A to 11D, the hues of digital video signals are corrected in accordance with the control data $D_{CONT}$ outputted from the editor 18 and then are sent to the switcher 12, whereby the hues can be corrected by preset amounts in compliance with requirements for individual cuts played back automatically by the digital video tape recorders 2A-2D in conformity with a preset editing procedure.

Meanwhile the digital video tape recorder 4 receives digital video signals from the switcher 12 via a serial-to-parallel converter 16 and then records the digital video signals transferred serially, thereby recording an edited program.

The operation of the digital video tape recorder 4 is switched in accordance with the control data $D_{CONT}$ outputted from the editor 18, and the reproduced digital video signal therefrom is supplied via a parallel-to-serial converter 20 to both a monitor device 22 and a color correction circuit 23.

Similarly to the aforementioned color correction circuits 11A-11D, the color correction circuit 23 includes an internal serial to parallel converter 21 for converting the received serial signal to parallel signals, corrects the hue of the serially transferred digital video signal in accordance with the control data $D_{CONT}$ outputted from the editor 18 and then supplies the corrected signal to the switcher 12 via a parallel-to-serial converter 25 incorporated into the color correction circuit 23.

Therefore, in the digital video tape recorder 4, it is possible to switch the operation thereof to a playback mode when necessary or to confirm the recorded image on the monitor device 22.

The digital video signal inputted to or outputted from the digital video tape recorder 4 is serially transferred, and the operation thereof is selectively switched in accordance with the control data $D_{CONT}$ outputted from the editor 18, so that long-distance transfer of the digital video signal can be performed with facility similarly to the aforementioned digital video tape recorders 2A-2D, whereby the digital video tape recorder 4 is rendered smaller in size to eventually realize a dimensional reduction of the editing apparatus 1 as a whole with another advantage of enhancing the operational facility thereof.

The monitor switcher 26 selectively switches its contacts in accordance with the control data $D_{CONT}$ outputted from the editor 18 and thereby selectively supplies to the monitor device 28A either the digital video signal outputted from the parallel-to-serial converters 8A-8D or the digital video signal inputted to the serial-to-parallel converter 16.

Thus, in an editing operation, each preview image can be monitored via the monitor device 28A.

The monitor device 28A is so contrived that a time code can be superimposed on the digital video signal being displayed.

Character generators (CG) 30A-30C produce superimpose characters together with key signals thereof and serially transmit such characters to the switcher 12 via parallel-to-serial converters 32A-32C respectively.

The characters and key signals produced by the character generators 30A-30C are transferred also serially in the same manner as the digital video signals relative to the digital video tape recorders 2A-2D and 4, so that the entirety of the editing apparatus 1 is dimensionally reduced while the operational facility thereof can be enhanced.

Image sensors 34A and 34B pick up chromakey images and supply the resultant chrominance signals to the switcher 12 via camera control units (CCU) 36A and 36B.

The switcher 12 receives at its control circuit 38 the control data $D_{CONT}$ outputted from the editor 18.

The control circuit 38 accesses a floppy disk (FD) in accordance with the control data $D_{CONT}$ and changes the operation of the switcher 12 in response to the result of such access.

Figure 2:
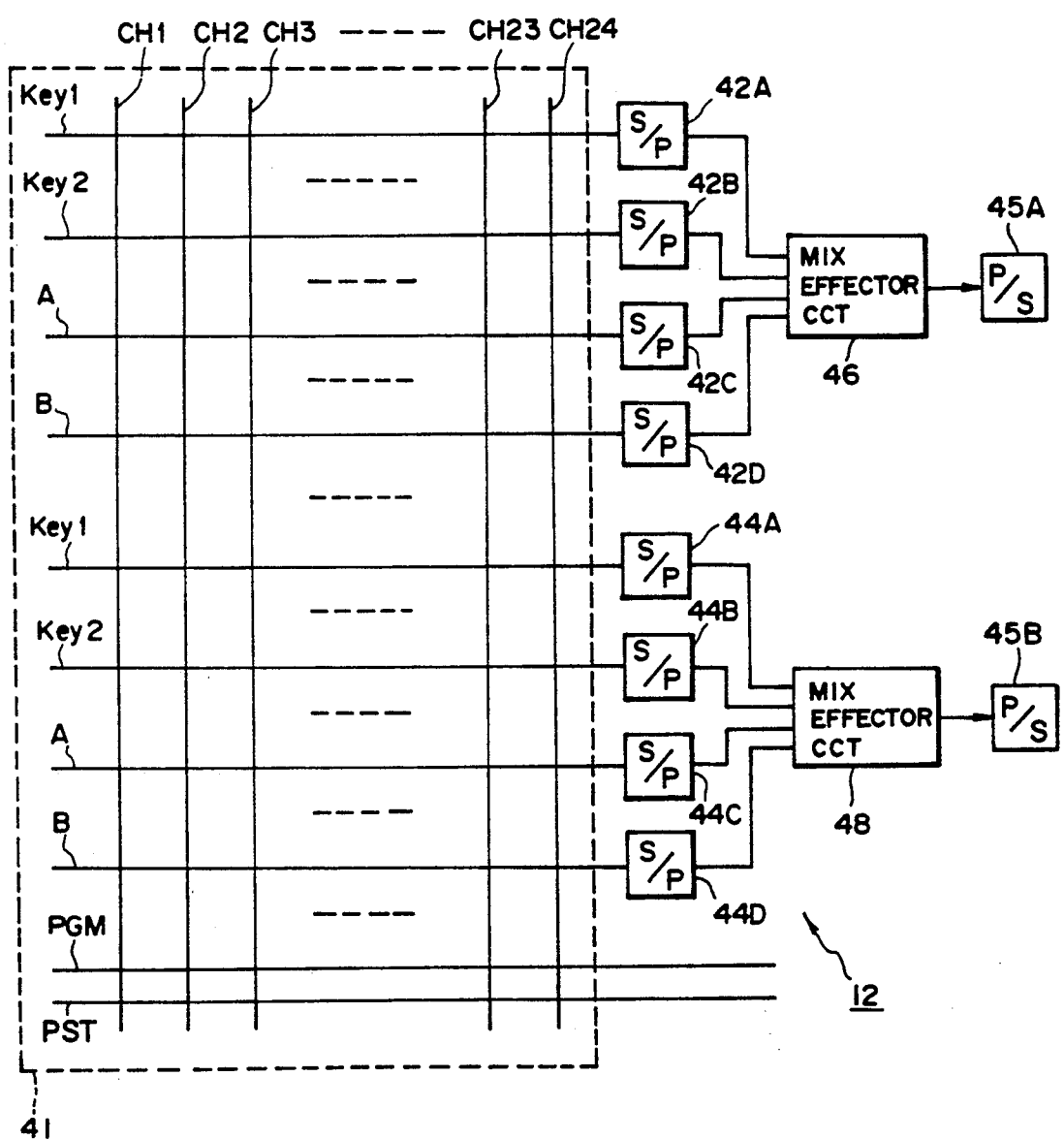
FIG. 2 is a block diagram of a switcher employed in the editing apparatus shown in FIG. 1.

More specifically, as shown in FIG. 2, the switcher 12 has a matrix switch circuit 41 with 24-channel input lines CH1-CH24 and supplies a digital video signal to a predetermined input line out of the lines CH1-CH24.

Further the switcher 12 connects buses A, B, key1, key2 of two systems, which form cross points between the switcher 12 and the input lines CH1-CH24 respectively, to serial-to-parallel converters 42A-42D and 44A-44D, and supplies to mix effectors 46 and 48 the digital video signals outputted from the serial-to-parallel converters 42A-42D and 44A-44D.

In the above arrangement, the cross points of the input lines CH1-CH24 and the buses A, B, key1, key2 are selectively switched to an on-state in accordance with the control data $D_{CONT}$ outputted from the editor 18, whereby the digital video signals outputted from the digital video tape recorders 2A-2D, 4, the mix effectors 46, 48 and the special effect device 52 are selectively supplied to the mix effectors 46 and 48.

The matrix switch circuit 41 has a program bus PGM and a preset bus PST forming cross points with the input lines CH1-CH24 respectively and transfers the edited digital video signal via the buses PGM and PST.

More specifically, the matrix switch circuit 41 transfers the edited digital video signal to the parallel-to-serial converter via the program bus PGM and also transfers to the digital video tape recorder 4 the digital video signal outputted from the parallel-to-serial converter.

Subsequently the switcher 12 ensures connection of the successive digital video signal by the use of the remaining preset bus PST and supplies the preselected digital video signal to the program bus PGM via the preset bus PST in accordance with the control data $D_{CONT}$.

Thus the digital video signal transferred serially is selected by the matrix switch circuit 41 and then is converted into a parallel form to thereby simplify the structure of the matrix switch circuit 41.

When the digital video signal inputted via a 25-pin connector is selected by the matrix switch circuit as in the conventional apparatus, the number of required input lines and buses is equal to that of the pins of such connector to consequently complicate the structure of the switcher.

However, if the digital video signal transferred serially is selected by the matrix switch circuit 41 and then is converted into a parallel form, it becomes possible to eliminate the necessity of forming a parallel arrangement of input lines and buses, hence simplifying the matrix switch circuit 41 and achieving a dimensional reduction of the switcher 12.

In a practical construction of this embodiment, the known height of the conventional switcher exceeding 880 mm was reduced to 88 mm.

The mix effectors 46 and 48 are controlled by the control circuit 38 and process the input digital video signals in a predetermined manner.

More specifically, when wipe control data $D_{CONT}$ is outputted from the editor 18 as shown in FIG. 3, the mix effectors 46 and 48 are so activated that the output signal of the mix effector 46 or 48 is switched with a wipe operation from the digital video signal inputted via the bus A for example to the digital video signal inputted via the bus B.

In this stage, the mix effectors 46 and 48 sequentially change the signal switchover timing in the horizontal scanning direction for example in accordance with the result of an access to the floppy disk (FD) 40 and thereby execute the wipe in the manner designated by the control data $D_{CONT}$.

Further in the wipe for example, there is performed an operation of forming a thick line at the border BD between two frames of images, or setting the border in a predetermined color, or blurring the contour of the border in accordance with the control data inputted previously to the floppy disk 40 via the console panel 49.

Since the wipe or the like process is executed in accordance with the control data $D_{CONT}$ outputted from the editor 18 and in the configuration stored previously on the floppy disk 40, it becomes possible to perform any minute editing operation exactly in the preset manner in accordance with the control data $D_{CONT}$.

Therefore the edit configuration can be confirmed many times by repeated rehearsals and, if necessary, the wipe or the like is easily changeable to any other processing mode by renewing the control data stored on the floppy disk 40, whereby the operational facility of the editing apparatus 1 is enhanced due to such improvement.

Practically in the conventional editing apparatus, a wipe or the like is started on the basis of a reference signal outputted from the editor and then is executed in the manner conforming with the manipulation of the console panel.

Accordingly, when a rehearsal is repeated later, it is necessary to manipulates the console panel over again, so that there exists some difficulties in exactly resuming the edit configuration with another disadvantage of intricate manipulation.

Thus, due to execution of a wipe or the like in the configuration stored previously on the floppy disk 40, any minute editing operation can be performed precisely in the preset manner, and the desired edit configuration can be reproduced many times repeatedly.

The mix effectors 46 and 48 synthesize the selectively inputted images with reference to key signals obtained from the character generators 30A-30C, the image sensors 34A, 34B and the special effect device 52, thereby forming a synthesized image where chromakey effect is added or, as illustrated in FIG. 4, a reduced-size image C is inserted into the image A.

The mix effectors 46 and 48 supply the edited digital video signals via parallel-to-serial converters 45a, 45b, respectively to the monitor devices 50A and 50B, respectively so that the editing process can be confirmed by means of the monitor devices 50A and 50B.

In the editing operation, the switcher 12 serially transfers to the monitor device 29B the digital video signal selected in the program bus PGM, thereby monitoring the edited digital video signal by means of the monitor device 28B.

Similarly to the switcher 12, the special effect device 52 receives at its control circuit 54 the control data $D_{CONT}$ outputted from the editor 18 and then accesses the floppy disk 56 in accordance with the control data $D_{CONT}$, thereby processing the input digital video signal in accordance with the result of such access.

The special effect device 52 receives both the digital video signal and the key signal from the switcher 12 via a serial-to-parallel converter 47a and, after adding a special effect thereto, serially transfers the processed signal to the switcher 12 via a parallel to serial converter 47b.

In this stage, the control circuit 54 serves for adding desired special effects such as reduction, enlargement, rotation, deformation or the like of the image in conformity with a preset procedure stored on a floppy disk 56 previously by manipulating the console panel 49.

More specifically, when there is inputted control data $D_{CONT}$ indicating a page turn operation for example as illustrated in FIG. 5, the input digital video signal is so processed as to start a page turn from the designated portion (left lower corner in the example of FIG. 5) in accordance with the data inclusive of the time and so forth required for such page turn and stored previously on the floppy disk 56.

In case the input control data $D_{CONT}$ indicates a size reduction or enlargement of the image, the input digital video signal is processed in accordance with the data inclusive of the reduction or enlargement ratio, the center position and so forth preset on the floppy disk 56.

Thus the digital video signal is processed in conformity to the procedure stored previously on the floppy disk 56 in accordance with the control data $D_{CONT}$ outputted from the editor 18, so that it is rendered possible by repeated rehearsals for example to confirm many times the state of the image processed with the special effect.

Consequently, the size reduction or enlargement speed is easily switchable in compliance with each requirement by renewing the control data stored previously on the floppy disk 56, hence attaining further enhancement in the operational facility of the editing apparatus 1.

Practically in the conventional editing apparatus where the special effect process is started in response to the reference signal outputted from the editor, such process is executed in conformity with the procedure determined by the manipulation of the console panel.

Therefore, when a rehearsal is repeated later, it is necessary to manipulate the console panel over again, so that there exist some difficulties in exactly reproducing the special effect so many times with another disadvantage of intricate manipulation.

In contrast therewith, according to the present invention where the special effect process is executed in conformity with the procedure stored previously on the floppy disk 56, the preset speed and so forth can be retained for executing the special effect process in the editing operation, thereby attaining repeated reproduction in compliance with requirements.

Further from the special effect device 52, the digital video signal with a special effect added thereto is outputted together with its key signal to the switcher 12 via the parallel-to-serial converter 47b.

Consequently, in the special effect device 52 also, the area occupied by the connector can be diminished due to serial transfer of the digital video signal to thereby achieve a dimensional reduction of the device 52.

Since the digital video signal with a special effect added thereto is outputted together with its key signal to the switcher 12, the special effect device and the mix effector can be combined with each other for insertion of a different image in the page-turned image illustrated in FIG. 6, hence further enhancing the operational facility or the editing apparatus 1 as a whole.

In this embodiment, the control circuit 54 is capable of inputting control data from and outputting the same to the control circuit 38 in the switcher 12, thereby adding a special effect to the signal in response to the editing operation of the switcher 12.

Thus, as illustrated in FIG. 7 for example, it becomes possible to first insert an image C, which has been reduced in size by the special effect device 52, into an image B and then, with a wipe from an image A toward the image B, to insert the image C into the image A while further reducing and rotating the image C as represented by a broken line during the time required for such wipe.

Thus, with transfer of the control data $D_{CONT}$ between the special effect device 52 and the switcher 12, the special effect can be combined with the process executed by the switcher 12, hence further enhancing the operational facility of the editing apparatus.

The editor 18 displays on the monitor device 62 the input data received via the keyboard 60 and supplies the control data $D_{CONT}$ in response to such input data.

At the time of a rehearsal in the editing operation, the control data $D_{CONT}$ is outputted in response to the input data, so that a tape cassette designated by the operator is played back by a desired one of the digital video tape recorders 2A-2D.

Consequently, with control of the switcher 12 and the special effect device 52, the operator manipulates the console panel 49 to add a preset special effect and so forth.

In this stage, the control data $D_{CONT}$ is outputted to the color correction circuits 11A-11D, and the hues of the digital video signals outputted from the digital video tape recorders 2A-2D are corrected.

Thereafter, at the time of such rehearsal, the control data $D_{CONT}$ outputted to all of the control circuit 6, the switcher 12 and the special effect device 52 are recorded on the floppy disk 64, so that the operator is enabled to repeat the rehearsal as many times as he desires.

Thus, the entirety of the editing apparatus 1 is integrally controlled by supplying the control data $D_{CONT}$ from the editor 18 to all of the digital video tape recorders 2A-2D and 4, the color correction circuits 11A-11D, the switcher 12 and the special effect device 52.

Accordingly, the rehearsal can be repeated many times merely by manipulating the keyboard 60 in compliance with requirements, thereby enhancing the operational facility of the editing apparatus 1.

When predetermined input data is received via the keyboard 60, the editor 18 records on the floppy disk 64 the control data $D_{CONT}$ outputted at the rehearsal to the control circuit 6, the switcher 12 and the special effect device 52, together with identification data, time codes and so forth of the tape cassettes in the time-series sequence and in the input order designated by the operator, thereby preparing an editing data list where the control data $D_{CONT}$ required for sequentially controlling the editing apparatus 1 are arranged in the editing order.

In practice when the tape cassettes are edited, the control data $D_{CONT}$ are outputted, subsequently to arrival of predetermined input data, in the order designated in the editing data list.

Then the editor 18 controls the switcher 12 and the special effect device 52 in a manner to execute the operation preset on the floppy disks 40 and 56, whereby the control circuit 6 is activated for driving the desired digital video tape recorders 2A-2D to play back the desired tape cassettes.

Further the digital video tape recorder 4 functions to record the edited digital video signals, while the color correction circuits 11A-11D correct the hues of the digital video signals for individual cuts.

Thus, when the tape cassettes are edited in practice, the entirety of the editing apparatus 1 is controlled integrally by the editor 18, so that desired cuts are edited sequentially and automatically in conformity with the preset minute edit configuration.

Further in the embodiment mentioned, the editor 18 supplies the control data $D_{CONT}$ to an audio mixer 66 in accordance with the editing data list and the manipulation of the keyboard, so that digital audio signals played back by the digital video tape recorders 2A-2D are edited and recorded.

At a rehearsal for preparing an editing data list in the constitution mentioned above, control data $D_{CONT}$ are outputted from the editor 18 by manipulation of the keyboard 60 to control the entirety of the editing apparatus 1, whereby the rehearsal can be performed as desired.

According to the control circuit 6, a desired tape cassette designated by the operator is carried from the shelf assembly and is loaded in a designated one of the digital video tape recorders 2A-2D, and thereafter the loaded tape cassette is played back by the relevant one of the digital video tape recorders 2A-2D.

Meanwhile in the switcher 12, digital video signals transferred serially from the color correction circuits 11A-11D, 23, the special effect device 52 and the character generators 30A-30C are outputted selectively via the matrix switch circuit 41 to the mix effectors 46, 48, where the digital video signals are processed in the mode preset on the floppy disk 40 by manipulating the console panel 49.

And in response to manipulation of the keyboard 60, the processed digital video signals are selectively supplied to the digital video tape recorders 2A-2D, 4 and the special effect device 52 while being supplied also to the monitor devices 28B, 50A, 50B.

Thus, the structures of the digital video appliances inclusive of the digital video tape recorders 2A-2D 4, the special effect device 52 and the switcher 12 can be simplified due to such serial transfer of the digital video signals.

Particularly in the switcher 12 where the digital video signal outputted serially from the matrix switch circuit 41 is processed after being converted into a parallel form, the structure of the matrix switch circuit 41 can be simplified with a dimensional reduction.

Meanwhile in the special effect device 52, the digital video signal transferred serially from the switcher 12 is processed in the procedure preset on the floppy disk 49 by manipulation of the console panel 40, whereby a special effect is added to the digital video signal.

Thus, the control data $D_{CONT}$ are outputted from the editor 18 to the control circuit 8, the digital video tape recorder 4, the color correction circuits 11A-11D, the switcher 12, and the special effect device 52 to achieve integral control of the entire editing apparatus 1, hence executing repeated rehearsals merely by manipulation of the keyboard 60 while changing the editing process whenever necessary.

Predetermined input data are sequentially supplied via the keyboard 60 in response to the result of the rehearsal to thereby store the editing data list on the floppy disk 64, and then desired cuts are edited sequentially in conformity with the editing data list.

In this stage, desired tape cassettes are played back by desired digital video tape recorders 2A-2D, while the hues of the digital video signals are corrected for the individual cuts in the color correction circuits 11A-11D.

The operations preset on the floppy disks 40 and 56 are executed in the switcher 12 and the special effect device 52, and the edited digital video signals are recorded by the digital video tape recorder 4.

Since all of the control circuit 6, the digital video tape recorder 4, the color correction circuits 11A-11D, the switcher 12 and the special effect device 52 are integrally controlled by the editor 18, it becomes possible to automatically process and edit the desired tape cassettes to thereby enhance the operational facility of the editing apparatus 1.

According to the above-described constitution where digital video signals are transferred serially among the digital video appliances, the area occupied by the connectors in the digital video appliances can be diminished to attain dimensional reductions of the individual appliances, hence decreasing the dimensions of the editing apparatus 1 as a whole.

Furthermore, the digital video signal outputted serially from the matrix switch circuit 41 is processed after being converted into a parallel form through the switcher, so that the structure of the matrix switch circuit 41 can be simplified to attain a dimensional reduction of the entirety.

In addition, integral control of the control circuit 6, the digital video tape recorder 4, the color correction circuits 11A-11D, the switcher 12 and the special effect device 52 can be performed by the editor 18 to consequently realize repeated rehearsals whenever required, hence accomplishing automatic edit of any desired tape cassettes to thereby enhance the operational facility of the editing apparatus 1.

The embodiment mentioned above represents an example where digital video tape recorders are employed as playback means. However, the present invention is not limited to such example alone and is widely applicable to a case of editing analog video signals obtained from video tape recorders through analog-to-digital converters or to a case of editing video signals outputted from video disk players instead of video tape recorders.

The above embodiment has been described with reference to an exemplary case where floppy disks are provided in the switcher 12 and the special effect device 52 respectively and the contents to be processed are stored on the floppy disks. However, the present invention is not limited thereto alone and may be so contrived that the contents to be processed are controlled integrally by the editor 18.

In the above embodiment, the editor 18 serves to control all of the control circuit 6, the video tape recorder 4, the color correction circuits 11A–11D, 23, the switcher 12, the special effect device 52, the monitor switcher 26 and the audio mixer 66. However, the present invention is not limited to such example alone and may be applied to a modification as well where the character generators 30A–30C are also controlled together.

Furthermore, although the above embodiment represents an exemplary case of applying the present invention to an editing apparatus equipped with character generators, the present invention is not limited thereto merely and may also be applied to any of other types where a variety of video signals are processed and edited.

According to the present invention, as described hereinabove, the area occupied by the connectors can be decreased due to serial transfer of video signals among digital video appliances to consequently render the sizes of such digital video appliances smaller, hence achieving a dimensional reduction of the editing apparatus as a whole.

Also according to the present invention where serially transferred video signals are first selected by the switcher and then are processed after being converted into a parallel form, the structure of the selection means can be simplified to realize a dimensional reduction of the editing apparatus.

And further according to the present invention where the digital video appliances are controlled by the main controller, there is accomplished an improved editing apparatus which is capable of repeating rehearsals by simple manipulation and performing an automatic editing operation.

What is claimed is:

1. An editing apparatus, comprising:
   playback means for reproducing video signals from a recording media,
   recording means for recording the reproduced signals on a recording medium,
   a signal processing means for adding special effects to an input video signal to produce a processed signal and outputting a processed signal;
   a switcher including:
   a plurality of input terminals,
   a plurality of output terminals, and
   means for selectively delivering a video signal from any one of the plurality of input terminals to a desired one of the plurality of output terminals;
   a first parallel-to-serial converting means for executing parallel-to-serial conversion of a digital video signal obtained from the playback means and supplying a first parallel-to-serial converted signal to a first input terminal of the switcher;
   a first serial-to-parallel converting means for executing serial-to-parallel conversion of a digital video signal obtained from a first output terminal of the switcher and supplying a first serial-to-parallel converted signal to the signal processing means;
   a second parallel-to-serial converting means for executing parallel-to-serial conversion of a digital video signal obtained from the signal processing means and supplying a second parallel-to-serial converted signal to a second input terminal of the switcher; and
   a second serial-to-parallel converting means for executing serial-to-parallel conversion of a digital video signal obtained from a second output terminal of the switcher and supplying the converted signal to the recording means.

2. An editing apparatus according to claim 1, wherein the playback means and the recording means each comprise a digital video tape recorder/player.

3. An editing apparatus according to claim 1, wherein the switcher comprises:
   a selecting means for selectively outputting as a selected digital video signal either the first parallel-to-serial converted signal or the second parallel-to-serial converted signal;
   a third serial-to-parallel converting means for executing serial-to-parallel conversion of the selected digital video signal obtained from the selecting means and outputting a third serial-to-parallel converted signal;
   a mix effector means for level-processing the third serial-to-parallel converted signal and outputting a processed signal; and
   a third parallel-to-serial converting means for executing parallel-to-serial conversion of the processed signal obtained from the mix effector means and outputting a third parallel-to-serial converted signal.

4. An editing apparatus according to claim 1, further comprising a control means for controlling the playback means, the recording means, the signal processing means and the switcher in accordance with a set of editing data.

5. An editing apparatus according to claim 4, wherein the editing data are reproduced from a recording medium.

6. An editing apparatus according to claim 4, wherein the recording medium comprises at least one floppy disk.

7. An editing apparatus according to claim 1, further comprising a plurality of playback means for selectively and separately reproducing digital video signals in parallel form from the recording media and wherein the first parallel-to-serial converting means separately converts the parallel form digital video signals from the plurality of playback means into a plurality of separate first parallel-to-serial converted signals and supplies them to separate ones of the plurality of input terminals of the switcher.

* * * * *